Dec. 23, 1969 UMEO HONMA 3,485,289
METHOD FOR THE MANUFACTURE OF ALUMINUM OR ALUMINUM ALLOY CASTINGS
Filed Jan. 25, 1967 2 Sheets-Sheet 1
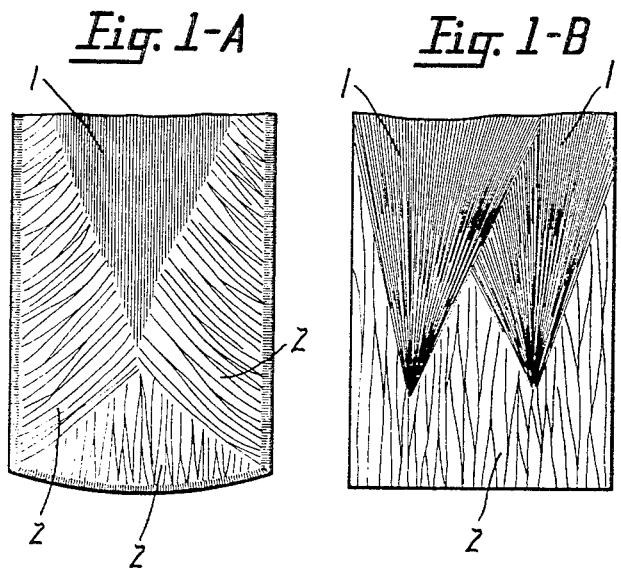
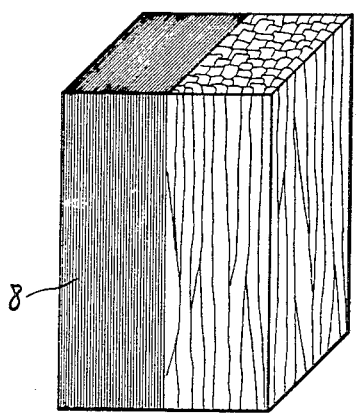
UMEO HONMA
INVENTOR
BY Berman + Berman
ATTORNEYS

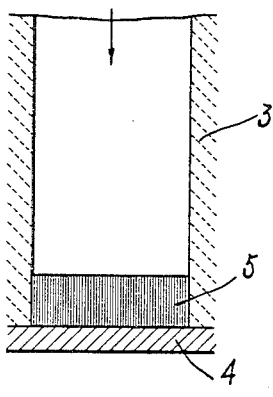
Fig. 2-A
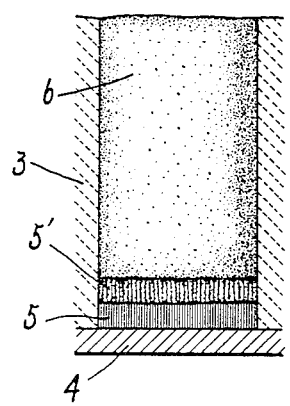
Fig. 2-B
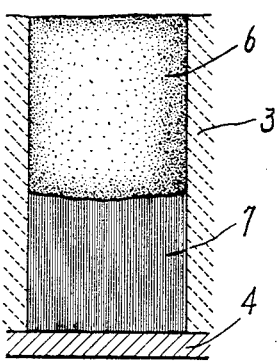
Fig. 2-C
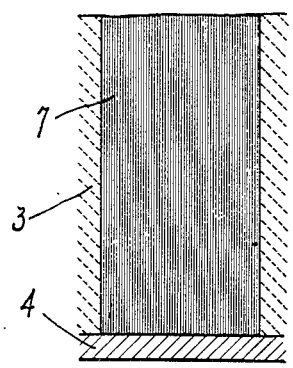
Fig. 2-D

United States Patent Office 3,485,289
Patented Dec. 23, 1969

3,485,289
METHOD FOR THE MANUFACTURE OF ALUMINUM OR ALUMINUM ALLOY CASTINGS
Umeo Honma, Tokyo, Japan, assignor to Mitsubishi Chemical Industries Limited, Tokyo, Japan, a corporation of Japan
Filed Jan. 25, 1967, Ser. No. 611,618
Claims priority, application Japan, Feb. 1, 1966, 41/5,363
Int. Cl. B22d 19/00
U.S. Cl. 164—102                                    13 Claims

ABSTRACT OF THE DISCLOSURE

Method for the manufacture of a casting of aluminum having growth twin crystals, characterized in placing a seed plate made from aluminum having a growth twin structure on the cooling end of a mold, pouring said metal in the molten state into the mold thereby forming a fused layer between the seed plate and the poured metal and subjecting the metals in the mold cavity to cooling to bring about the unidirectional solidification from the seed plate towards the opposite end of the mold, said seed plate coated with at least one flux selected from the group consisting of ethane hexachloride, sodium silicofluoride, sodium fluoride, potassium fluoride, zincchloride, and sodium chloride.

---

The invention relates to a method for making aluminum or aluminum base alloy ingots.

The crystal structure of the aluminum ingot may be classified into three types, the columnar crystal, granular or equi-axed crystal and growth twin or feather crystal structures. It is an object of the invention to provide a method for the manufacture of aluminum or aluminum base alloy ingots having growth twin crystals formed.

It is a further object of the invention to provide a method for the manufacture of aluminum or aluminum base alloy ingots having growth twin crystals formed in which twin planes of the growth twin crystals are arranged in a direction as desired.

In order to accomplish the said objects the present invention provides the method for making an aluminum or aluminum base alloy ingot having a growth twin structure which comprises placing a seed plate made of aluminum or aluminum base alloy having a growth twin structure on the bottom of an ingot mold to cover entirely or partly the upper surface thereof, the twin planes of the seed plate being arranged in the direction parallel to the direction of heat extraction of the metal to be cast, pouring molten aluminum or aluminum base alloy into the mold thereby forming a fused layer between the seed plate and the said molten metal, and cooling the resulting cast metal so that unidirectional solidification initiates from the seed plate.

It has been known by experience that as compared with the columnar or equi-axed structure, the growth twin structure in an aluminum ingot gives a rolled plate therefrom better finished surfaces. For this reason, demand for aluminum ingots having the growth twin structure is ever increasing. However, no certain knowledge has been had with regard to the principle based on which the growth twin structure forms in an aluminum ingot although it has been recognized that the continuous casting is preferred to other modes of casting for the purpose of manufacturing ingots of growth twin structure. Consequently, the casting conditions, including pouring temperature and pouring rate of molten metal or mode of cooling of the castings, deemed favorable for the formation of growth twins have been selected only by personal experience.

Also it has been known that the formation of growth twins in a pure aluminum ingot is accomplished only by the continuous casting, while other modes of casting may prove somewhat satisfactory with aluminum alloys such as aluminum-magnesium, aluminum-copper, or aluminum-silicon.

As has been described, there has been no certain knowledge as to the requirements for the formation of growth twins and, hence, no reliable procedures have been established for the manufacture of aluminum or aluminum alloy castings having a perfect growth twin structure. Also no information has been available having regard to the method for arranging the twin planes in a direction as required.

The invention will now be compared with conventional methods by reference to the attached drawings in which:

FIGURES 1-A and 1-B show longitudinal sectional views of the crystal structure of castings having growth twin crystals or feather crystals grown, FIGURE 1-A indicating the parallel growth twin structure which formed by the continuous casting and FIGURE 1-B the divergent growth twin structure which formed by the sand mold casting, in which the numerals 1 and 2 indicate growth twin crystals and columnar crystals, respectively;

FIGURES 2-A, 2-B, 2-C, and 2-D are longitudinal sectional views of an ingot mold to show diagrammatically the progress of formation of growth twin crystals in a casting according to the invention in which the numeral 3 denotes the side-walls of the ingot mold made of refractory material, the numeral 4 the chill plate made of as for example pure copper, the numeral 5 the seed plate, the numeral 5' the fused layer, the numeral 6 the molten metal, and the numeral 7 the solidified metal comprised of growth twin crystals; and FIGURE 3 is a perspective view showing crystal structure of an aluminum casting in which growth twin crystals partly grew in accordance with the invention.

According to the method of the invention, a seed plate prepared from an aluminum or aluminum alloy having a growth twin structure is placed on the bottom of an ingot mold; a molten metal is poured into the ingot mold so as to form a fused layer between the poured molten metal and the seed plate; then the cooling of the ingot is effected through the seed plate remaining solid, resulting in the development of growth twin crystals of the seed plate in the direction opposite to the direction of heat extraction of the poured metal. The growth twin crystal takes precedence in growth over other types of crystal such as columnar crystal or equi-axed crystal. Therefore, the molten metal cast in the mold in accordance with the invention completes the solidification accompanied by the growth twin structure formed thoroughly from the seed plate towards the top of the ingot mold.

The seed plate used in the method of the invention is made from an aluminum or aluminum alloy ingot having growth twin structure by cutting it normally of the side surfaces thereof. Preferably, the seed plate has the same composition of the metal to be cast although a slight difference in the composition is permissible.

If the surface of the seed plate is rusted or stained by oil and the like, there is a tendency to produce a layer such as an oxide film between the seed plate and the molten metal poured onto said surface thereby preventing the growth of crystals. Hence, it is desirable to make machining or finishing of the surface of the seed plate by means of a cutting tool or file which is followed preferably by supersonic cleaning or caustic alkali washing.

In pouring a molten metal into an ingot mold, it is of prime importance that a fused layer is formed between the seed plate 5 and the molten metal 6 while allowing a lower portion of the seed plate to remain solid. Accordingly, the thickness of a seed plate is determined so as to satisfy the said requirements. Suitable thickness of seed plate is in the range from 5 to 15 mm. for use in casting ordinary slabs although it may vary more or less departing the range dependently of the quantity of metal poured and conditions of pouring. Preferably, the upper surface of the seed plate is coated with a flux such as zinc chloride, ethane hexachloride, sodium chloride, sodium fluoride, potassium fluoride, and sodium silico-fluoride before the pouring of molten metal to facilitate the formation of a fused layer between the seed plate and the poured metal. For the same purpose the seed plate may be preheated. Suitable temperature for preheating is in the range from 100 to 250° C., depending on pouring conditions.

The pouring temperature may vary dependently of the type of metal for casting, the size of ingot and the operation conditions. For example, it is in the range 680–750° C. for aluminum alloys.

The rate of cooling of a poured metal is suitably selected so as to give rise to the unidirectional solidification from the seed plate to the top of the casting.

The application of the method of the invention to aluminum alloys, even to pure aluminum gives ingots having growth twin structure, while in the prior art there have been difficulties for pure aluminum to produce such ingots.

The term referred to as pure aluminum or aluminum in this specification means aluminum metal of a purity higher than 99.5 percent.

The arrangement of a seed plate in such a manner that the twin planes of said plate are perpendicular to the upper surface of the seed plate which covers the mold bottom entirely results in a casting having a growth twin structure developed in its entirety as seen in FIGURE 2–D.

On the other hand, it is possible to make a casting having a growth twin structure in desired portions as indicated at 8 in FIGURE 3, since the growth twin crystals originate only from a seed plate.

The angle between the twin planes in a casting and the surfaces thereof is determined, depending on the angle between the twin planes in the seed plate and the sidewalls of a mold. Therefore, in the manufacture of as for example slabs having a growth twin structure it is possible to permit the twin planes arranged vertical or parallel or oblique to the side surfaces of a casting. Still further, it is possible to make a casting having several groups of the twin crystals lying in various angles to the side surfaces of a casting by the employment of one or more seed plates having several groups of different orientation of growth twin crystals.

As compared with castings having a columnar structure, castings having a growth twin structure have improved thermal stability at elevated temperatures. Namely, when heated at 620° C. for 12 hours, a 99.85% aluminum casting having a columnar structure becomes moltenat the grain boundary having a high concentration of impurities. On the contrary, the growth twin structure in an aluminum casting of the same purity remains invariable even for 2 hours of heating at 620° C. This means that a casting with growth twin crystals is more homogeneous in quality than that with columnar crystals.

When subject to the plastic deformation, an aluminum ingot of growth twin structure is strained more homogeneously throughout the transverse section than that of the columnar structure. The latter is liable to suffer the surface hardening.

The property of a rolled plate made from a casting having growth twin structure is compared with that of a rolled plate made from a casting having columnar structure as follows:

(1) The recrystallization temperature of the former is approximately 30° C. higher than the latter, that is, the former is thermally more stable.

(2) Because of ordered orientation of crystals in the former, the surfaces of the former, when pickled and/or anodized, appear finer and even flatter than the latter.

(3) The former has more improved deformability than the latter. For instance, the Erichsen values of the former and the latter in the annealed state indicated 10.0 and 9.2, respectively.

EXAMPLE 1

The vertical type ingot mold employed in this example comprised sidewalls made from a refractory material and a chill plate bottom made from pure copper having 20 mm. thickness. The mold cavity was 60 mm. in width, 60 mm. in depth, and 200 mm. in height. A seed plate of growth twin structure having 12 mm. thickness was subject to supersonic cleaning and then placed on the chill plate so as to cover the entire surface of the bottom of mold cavity. The growth twin structure of the seed plate was such that the twin crystals paralleled in the direction of cooling. The seed plate was preheated to 250° C. and coated with ethane hexachloride before the employment. A quantity of molten aluminum of 99.85% purity was then poured into the mold at 790° C. and 10 seconds later the mold was cooled from the bottom of the chill plate by use of water to complete the solidification of the poured aluminum in 7½ minutes.

The resulting casting was found to have growth twins grown entirely.

EXAMPLE 2

The same process of Example 1 was followed for casting aluminum excepting that a seed plate was placed so as to cover by half the upper surface of the bottom of the mold. The resulting casting was found having growth twin crystals grown upwardly from the seed plate and columnar crystals grown upwardly from the chilled surface.

It will be understood that the method of the invention may be modified in various ways. For example, the continuous casting of vertical or horizontal type may be performed substantially in the same mode of the operation as hereinbefore described with reference to the employment of a vertical type ingot mold.

What is claimed is:

1. Method for the manufacture of a casting of aluminum having growth twin crystals, characterized in placing a seed plate made from aluminum having a growth twin structure on the cooling end of a mold, pouring said metal in the molten state into the mold thereby forming a fused layer between the seed plate and the poured metal and subjecting the metals in the mold cavity to cooling to bring about the unidirectional solidification from the seed plate towards the opposite end of the mold, said seed plate coated with at least one flux selected from the group consisting of ethane hexachloride, sodium silico-fluoride, sodium fluoride, potassium fluoride, zinc chloride, and sodium chloride.

2. Method according to claim 1 in which a plurality of seed plate are employed.

3. Method according to claim 1 in which the seed plate is placed on the cooling end of the mold so that the twin planes of the growth twin crystals in the casting to be produced in the mold parallel the twin planes in the seed plate.

4. Method according to claim 1 in which the seed plate is placed at a temperature from 100° to 250° C. on the cooling end of the mold.

5. Method for the manufacture of castings of aluminum having a growth twin structure which comprises placing a seed plate of aluminum having a growth twin structure on the upper surface of the bottom of an ingot mold of vertical type in such a manner that the twin planes of the seed plate are normal to the upper surface of the mold bottom, pouring said metal thereby forming a fused layer between said molten metal and the seed plate and subjecting the metals in the mold to cooling from the bottom of the mold, said seed plate being coated with at least one flux selected from the group consisting of ethane hexachloride, sodium silico-fluoride, sodium fluoride, potassium fluoride, zinc chloride, and sodium chloride.

6. Method according to claim 5 in which the seed plate is placed at a temperature from 100° to 250° C. on the upper surface of the bottom of the ingot mold.

7. Method according to claim 5 in which a chill plate is arranged at the bottom of the ingot mold and cooled with water by external means.

8. Method for the manufacture of a casting of aluminum base alloy having growth twin crystals, characterized in placing a seed plate made from aluminum base alloy having a growth twin structure on the cooling end of a mold, pouring said alloy in the molten state into the mold thereby forming a fused layer between the seed plate and the poured metal, and subjecting the metals in the mold cavity to cooling to bring about the unidirectional solidification from the seed plate towards the opposite end of the mold, said seed plate being coated with at least one flux selected from the group consisting of ethane hexachloride, sodium silico-fluoride, sodium fluoride, potassium fluoride, zinc chloride, and sodium chloride.

9. Method according to claim 8 in which the seed plate is placed on the cooling end of the mold so that the twin planes of the growth twin crystals in the casting to be produced in the mold parallel the twin planes in the seed plate.

10. Method according to claim 8 in which the seed plate comprises substantially the same material as the metal poured into the mold.

11. Method according to claim 8 in which a plurality of said plates are employed.

12. Method for the manufacture of a casting of aluminum having growth twin crystals, characterized in placing a seed plate made from aluminum having a growth twin structure on the cooling end of a mold, pouring said metal in the molten state into the mold thereby forming a fused layer between the seed plate and the poured metal and subjecting the metals in the mold cavity to cooling to bring about the unidirectional solidification from the seed plate towards the opposite end of the mold, said seed plate having a surface onto which said metal is poured, said surface being previously finished by a cutting tool or file, said seed plate coated with at least one flux selected from the group consisting of ethane hexachloride, sodium silico-fluoride, sodium fluoride, potassium fluoride, zinc chloride, and sodium chloride.

13. Method for the manufacture of castings of aluminum having a growth twin structure which comprises placing a seed plate of aluminum having a growth twin structure on the upper surface of the bottom of an ingot mold of vertical type in such a manner that the twin planes of the seed plate are normal to the upper surface of the mold bottom, pouring said metal thereby forming a fused layer between said molten metal and the seed plate and subjecting the metals in the mold to cooling from the bottom of the mold, said seed plate having a surface into which said metal is poured, said surface being previously finished by a cutting tool or file, said seed plate coated with at least one flux selected from the group consisting of ethane hexachloride, sodium silico-fluoride, sodium fluoride, potassium fluoride, zinc chloride, and sodium chloride.

References Cited

UNITED STATES PATENTS

| | | | |
|---|---|---|---|
| 2,951,272 | 9/1960 | Kiesler | 164—80 |
| 2,683,676 | 7/1954 | Little et al. | 164—51 X |
| 2,651,831 | 9/1953 | Bond et al. | 164—51 X |
| 2,791,813 | 5/1957 | Delano | 164—60 |
| 3,060,065 | 10/1962 | Orem | 164—60 |
| 3,124,452 | 3/1964 | Kraft | 164—128 X |
| 3,239,899 | 3/1966 | Johnson | 164—60 |

J. SPENCER OVERHOLSER, Primary Examiner

V. RISING, Assistant Examiner

U.S. Cl. X.R.

164—105, 107